United States Patent
Ikeda et al.

(10) Patent No.: US 6,188,585 B1
(45) Date of Patent: Feb. 13, 2001

(54) DC POWER SUPPLY APPARATUS

(75) Inventors: Tetsuro Ikeda, Osaka; Kenzo Danjo, Soraku-gun; Yuji Ikejiri, Osaka, all of (JP)

(73) Assignee: Sansha Electric Manufacturing Company Limited, Osaka (JP)

(*) Notice: Under 35 U.S.C. 154(b), the term of this patent shall be extended for 0 days.

(21) Appl. No.: 09/506,789

(22) Filed: Feb. 18, 2000

(30) Foreign Application Priority Data

Mar. 2, 1999 (JP) .................................................. 11-053636

(51) Int. Cl.[7] .................................................. H02M 3/335
(52) U.S. Cl. .................. 363/17; 363/41; 363/98
(58) Field of Search ................. 363/16, 17, 97, 363/98, 131, 132, 40, 41

(56) References Cited

U.S. PATENT DOCUMENTS 4,523,268 * 6/1985 Brajer et al. .............................. 363/98
5,546,300 * 8/1996 Lee et al. ................................ 363/132

FOREIGN PATENT DOCUMENTS 1-215465 8/1989 (JP) .

* cited by examiner

Primary Examiner—Jessica Han
(74) Attorney, Agent, or Firm—Duane, Morris & Heckscher LLP

(57) ABSTRACT

A small-sized DC power supply apparatus adapted for receiving input commercial AC voltages of different value includes an AC-to-DC converter 4 which converts an input commercial AC voltage to a first DC voltage. The first DC voltage is converted to a high-frequency voltage in an inverter 10 including IGBTs 10a–10d which are rendered conductive when a conduction control signal is applied thereto. A transformer 12 transforms the high-frequency voltage, which is, then, converted to a second DC voltage in a high-frequency-to-DC converter 16 for application to a load 22. The conduction control signal with a pause period disposed therein is generated in a controller 14. The conduction control signal occurs at a fixed period. The pause period disposed between the successive occurrences of the conduction control signal becomes longer as the input commercial AC voltage is higher.

4 Claims, 7 Drawing Sheets

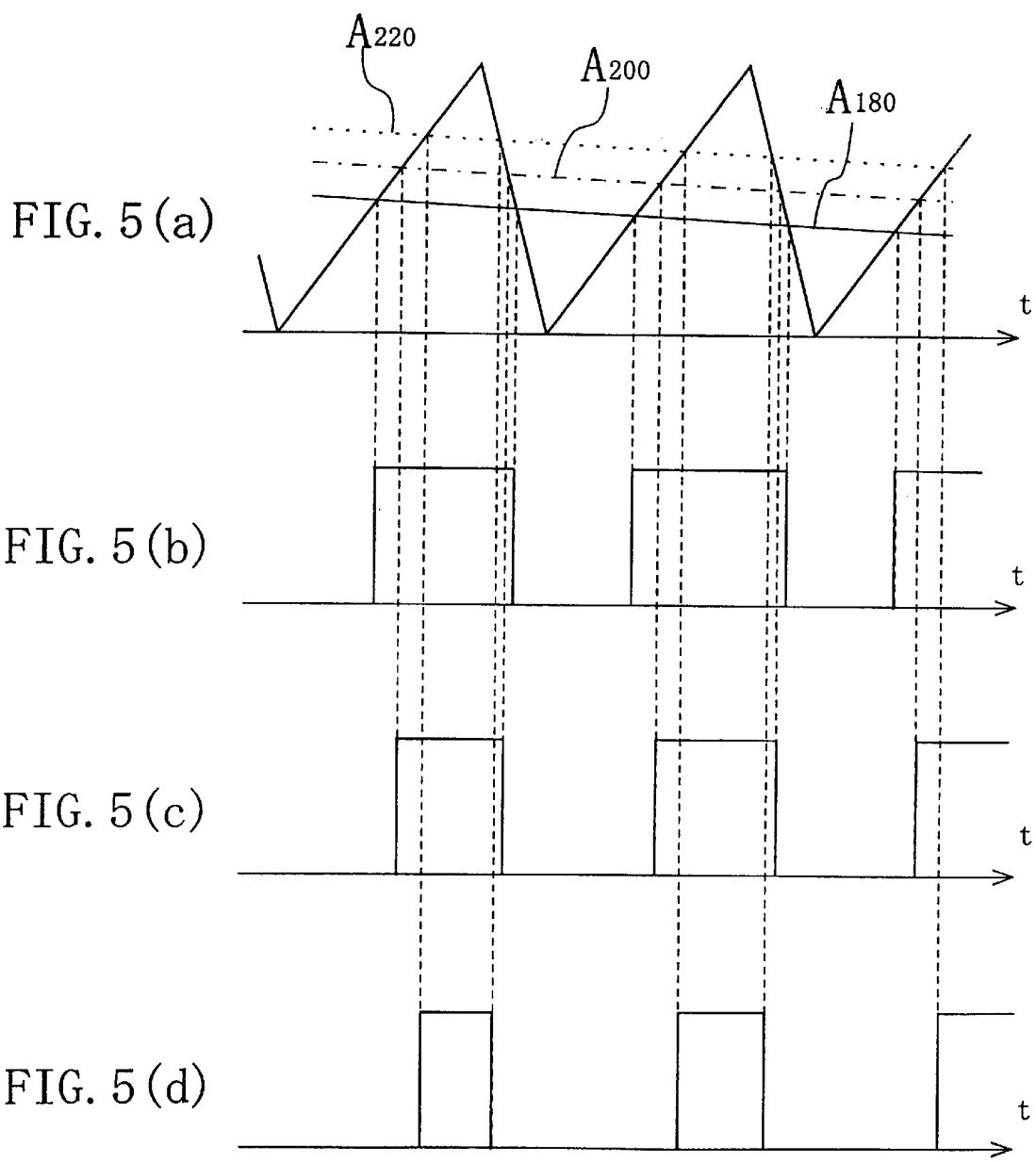

DC POWER SUPPLY APPARATUS

This invention relates to a DC power supply apparatus and, more particularly, to a DC power supply apparatus with a DC-to-high-frequency converter for converting a DC voltage to a high-frequency voltage.

BACKGROUND OF THE INVENTION

Many of DC power supply apparatuses, such as ones for a welder, a cutter, a plating system and a communications system, a battery charger and a DC power supply for use in igniting an arc lamp, include a DC-to-high-frequency converter so that the DC power supply apparatus with such converter can be made small in size and light-weighted.

A DC power supply apparatus of this type may include an input-side AC-to-DC converter which converts an input commercial AC voltage to a DC voltage. The DC voltage is, then, converted into a high-frequency voltage of, for example, from several kilohertz to 100 KHz, by a DC-to-high-frequency converter. The high-frequency voltage is, then, applied to a primary winding of a high-frequency transformer. This causes a high-frequency voltage of a predetermined magnitude to be developed in a secondary winding of the transformer. The high-frequency voltage developed in the secondary winding is converted back into a DC voltage by a high-frequency-to-DC converter. The resultant DC voltage is applied to a load.

The DC-to-high-frequency converter includes at least one of semiconductor switching devices, such as IGBTs, FETs and bipolar transistors. The semiconductor switching device is PWM controlled, i.e. rendered conductive when a conduction control signal is applied thereto, and is rendered nonconductive when the conduction control signal is removed, to thereby convert a DC voltage into a high-frequency voltage.

Load current supplied to the load is detected by a current detector, and a load-current representative signal is applied from the current detector to a controller. The controller supplies the semiconductor switching device in the DC-high-frequency converter with the conduction control signal at intervals for PWM controlling the semiconductor switching device in such a manner that the load-current representative signal becomes equal to a predetermined reference signal.

The magnitude of a commercial AC voltage differs from state to state and area to area. For example, a commercial AC voltage in one state may be 180 V, which, in other state, it may be 200 V or 220 V. Depending on the magnitude of the input commercial AC voltage applied, the magnitude of the DC output voltage of the input-side AC-to-DC converter, the peak value of the high-frequency voltage from the DC-to-high-frequency converter, the magnitude of the voltage across the secondary winding of the transformer and the magnitude of the DC output voltage of the high-frequency-to-DC converter vary.

For example, a solid line, a dot-and-dash line and a dotted line shown in FIG. 8 represent static output voltage-output current characteristics exhibited by a DC power supply apparatus of the above-described type when a commercial AC voltage of 180 V, 200 V and 220 V is applied to it, respectively. As is understood, as the commercial AC voltage is higher, the output voltage becomes larger.

Due to the alternation of the semiconductor switching device between conduction and non-conduction, voltage pulses are repetitively applied to the high-frequency transformer as shown in FIG. 9. There must be a vacant period between the respective voltage pulses. The shortest possible length td of the vacant period remains the same for a low AC supply voltage of, e.g. 180 V, represented by a solid line, an intermediate-magnitude AC supply voltage of e.g. 200 V represented by a dot-and-dash line, and a high AC supply voltage of e.g. 220 V as represented by a dotted line.

The number, n, of turns of the winding of the high-frequency transformer, which involves no magnetic saturation, is determined by the following expression (1).

$$n \propto \frac{E_{max} \times Ton_{max}}{\Delta B \times S} \quad (1)$$

In this expression (1), $E_{max}$ is the highest possible voltage applied to the transformer, $Ton_{max}$ is the longest time period during which the input voltage is applied to the transformer, $\Delta B$ is the magnetic flux density in the core of the transformer, and S is the cross-sectional area of the core. Usually, the time period td is constant, and the period of the conduction control signal is constant. Accordingly, the time period $Ton_{max}$ is constant. Therefore, if the DC power supply apparatus is used selectively with commercial AC voltages of different values, the highest possible voltage $E_{max}$, which is determined by the highest one of the commercial AC voltages, becomes higher. As the highest possible voltage $E_{max}$ is higher, the number, n, of turns and the cross-sectional area of the core increase, which results in increase of the size of the transformer.

Thus, even if the DC power supply apparatus employs a DC-to-high-frequency converter for converting a DC voltage to a high-frequency voltage as well as a high-frequency transformer for the purpose of reducing the size of the apparatus, it cannot be downsized if it is a DC power supply apparatus which is to be used with commercial AC voltages of different values.

For the purpose of downsizing, some power supply apparatuses employ a voltage-boosting or voltage-lowering converter disposed between the output of the input-side AC-to-DC converter and the input of the DC-to-high-frequency converter, which is so controlled as to develop a constant output voltage. In this case, since the voltage-boosting or voltage-lowering converter must control relatively large current, it must employ a relatively large switching control device. Also, this approach entails the use of complicated circuitry.

An object of the present invention is to provide an arrangement of a DC power supply apparatus, which does not necessitate the use of complicated circuitry and which can provide a small-sized DC power supply apparatus.

SUMMARY OF THE INVENTION

A DC power supply apparatus according to an embodiment of the present invention includes an AC-to-DC converter for converting a commercial AC signal into a first DC signal. The commercial AC signal may be a selected one of signals exhibiting different voltage values. A DC-to-high-frequency converter converts the first DC signal into a high-frequency signal. The DC-to-high-frequency converter includes a switching device which is rendered conductive during a period when a conduction control signal is applied to it, and the conduction and nonconduction of the switching device provides the conversion of a DC signal to a high-frequency signal. The DC-to-high-frequency converter may be, for example, an inverter or a switching regulator. A transformer transforms the high-frequency signal from the DC-to-high-frequency converter. Transformed high-frequency signal from the transformer is converted to a second DC signal in a high-frequency-to-DC converter, and the resulting DC signal is applied to a load. A controller generates the conduction control signal which recurs with a pause period between adjacent occurrences of the conduction control signal. The length of the pause period is longer as the voltage value of the commercial AC signal is larger. The time length between adjacent occurrences of the conduction control signal, i.e. the period of the conduction control signal, is fixed.

The controller may include a pause period control signal generator which receives the commercial AC signal and generates a pause period control signal having a value proportional to the voltage value of the commercial AC signal. The length of the pause period is determined by the value of the pause period control signal.

The controller may be so arranged as to provide at least first and second, two conduction control signals alternately. The DC-to-high-frequency converter may include first and second semiconductor switching devices. The first semiconductor switching device receives the first conduction control signal. The first semiconductor switching device becomes conductive while it is receiving the first conduction control signal, and provides the first DC signal in a first polarity to the transformer. The second semiconductor switching device receives the second conduction control signal. The second semiconductor switching device becomes conductive while it is receiving the second conduction control signal, and provides the first DC signal in a polarity opposite to the first polarity to the transformer.

The controller generates the first and second conduction control signals with the pause period disposed between adjacent occurrences of the first and second conduction control signals. It is desirable to arrange such that the sum of the duration of the first conduction control signal and the length of the pause period and the sum of the duration of the second conduction control signal and the length of the pause period have a fixed value.

The controller may include a pause period control signal generator which receives a commercial AC signal and generates a pause period control signal having a value proportional to the commercial AC signal, a sawtooth generator for generating a sawtooth signal having a predetermined period, and a comparator for providing the pause period starting when the value of the sawtooth signal starts departing in one direction from the value of the pause period control signal and ending when it returns to the value of the pause period control signal.

The controller may include a pause period control signal generator and a sawtooth generator which are of the above-described types, a detector for detecting an output signal applied to the load and developing an output representative signal, and an error signal generator for supplying a comparator of the above-described type with an error signal representative of a difference between the sum of the output representative signal and the pause period control signal and a predetermined reference signal.

The pause period control signal generator may include an AC-to-DC converter for converting the voltage of the commercial AC signal to a DC voltage. A DC voltage proportional to the value of the commercial AC voltage can be used as the pause period control signal. Even when the voltage of the commercial AC signal varies, the pause period can be controlled to track the variations of the commercial AC voltage.

BRIEF DESCRIPTION OF THE DRAWINGS

FIGS. 5(a) through 5(d) show a sawtooth signal provided by a sawtooth generator and output signals from a comparator of the DC power supply apparatus shown in FIG. 1, when the input commercial AC voltage is 180V, 200 V and 220 V, respectively, and an error amplifier develops an error output other than 0.

DETAILED DESCRIPTION OF PREFERRED EMBODIMENT

Figure 1:
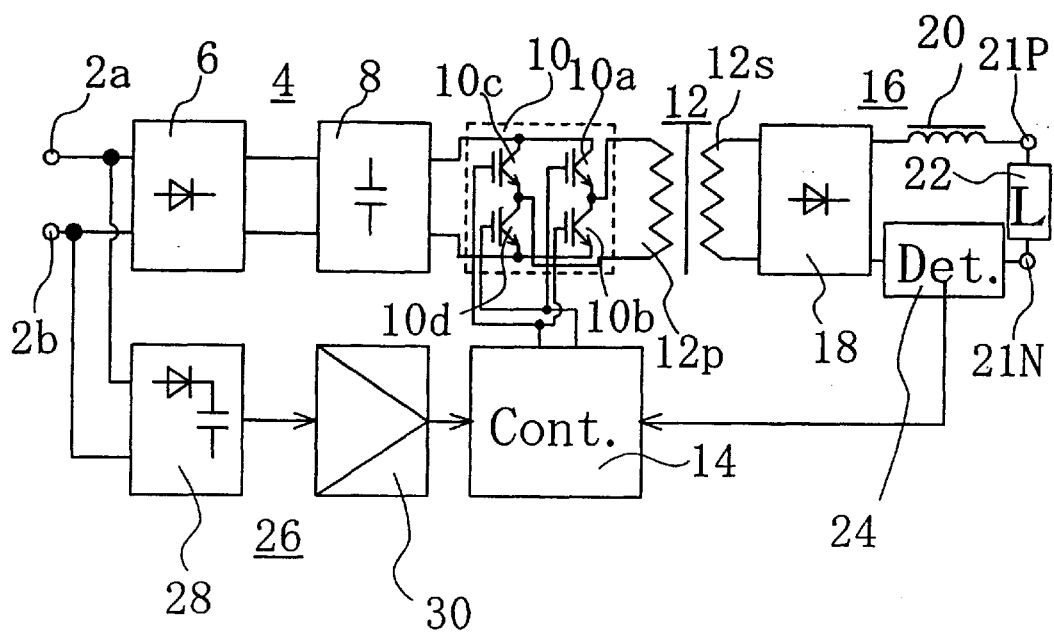
FIG. 1 is a block diagram of a DC power supply apparatus according to one embodiment of the present invention.

A DC power supply apparatus according to an embodiment of the present invention is arranged to be useable in any desired one of various countries and areas where commercial AC voltages of various values are used. The DC power supply includes power supply input terminals 2a and 2b. For example, a single-phase commercial AC power supply (not shown) may be connected between the input terminals 2a and 2b. The single-phase commercial AC power supply can selectively provide AC voltages of, for example, 180 V, 200 V and 220 V. In place of the single-phase commercial AC power supply, a three-phase commercial AC power supply may be used.

The commercial AC voltage applied between the input terminals 2a and 2b is rectified in a rectifying circuit 6 of an AC-to-DC converter 4. The rectifying circuit 6 may be a half-wave rectifier circuit or full-wave rectifier circuit. The output voltage from the rectifying circuit 6 is smoothed in a smoothing circuit 8 of the AC-to-DC converter 4. The smoothing circuit 8 includes a smoothing capacitor. Thus, the commercial AC voltage is converted into a DC voltage in the AC-to-DC converter 4.

The DC voltage from the AC-to-DC converter 4 is applied to a DC-to-high-frequency converter 10, e.g. an inverter, where it is converted into a high-frequency voltage. The inverter 10 includes semiconductor switching devices, e.g. IGBTs 10a, 10b, 10c and 10d. In place of the IGBTs, power FETs or power bipolar transistors may be used.

The IGBTs 10a through 10d are connected in such a way that the respective collector-emitter paths are in respective ones of the branches of a full-bridge circuit. A transformer 12, e.g. a high-frequency voltage transformer, has it primary winding 12p connected, as a load, between the junction of the emitter of the IGBT 10a and the collector of the IGBT 10b and the junction of the emitter of the IGBT 10c and the collector of the IGBT 10d.

The IGBTs 10a and 10d are rendered conductive when a conduction control signal, e.g. a first conduction control signal, is applied to them from a controller 14 which will be described in detail later. Then, current flows from the IGBT 10a through the primary winding 12p to the IGBT 10d. The IGBTs 10c and 10b are rendered conductive when a conduction control signal, e.g. a second conduction control signal is applied to them from the controller 14, resulting in current flow from the IGBT 10c through the primary winding 12p to the IGBT 10b.

The first and second control signals alternate with each other, and, therefore, a rectangular high-frequency voltage is induced in a secondary winding 12s of the high-frequency transformer 12.

In place of the full-bridge type inverter, a half-bridge type inverter including capacitors in place of the IGBTs 10c and 10d may be used.

The high-frequency voltage induced in the secondary winding 12s of the high-frequency transformer 12 is rectified in a rectifying circuit 18 of a high-frequency-to-DC converter 16 and, then, smoothed in a smoothing circuit 20, e.g. a smoothing reactor, of the high-frequency-to-DC converter 16. The smoothed voltage is applied through output terminals 21P and 21N to a load 22. The rectifying circuit 18 may be a half-wave rectifier or a full-wave rectifier. The load 22 may include an arc load including a torch of a DC arc welder or cutter and a workpiece.

An output signal, e.g. output current, applied from the high-frequency-to-DC converter 16 to the load 22 is detected by an output current detector 24, which develops an output-current representative signal representing the value of the output current it detects. The output-current representative signal is applied to the controller 14.

Figure 2:
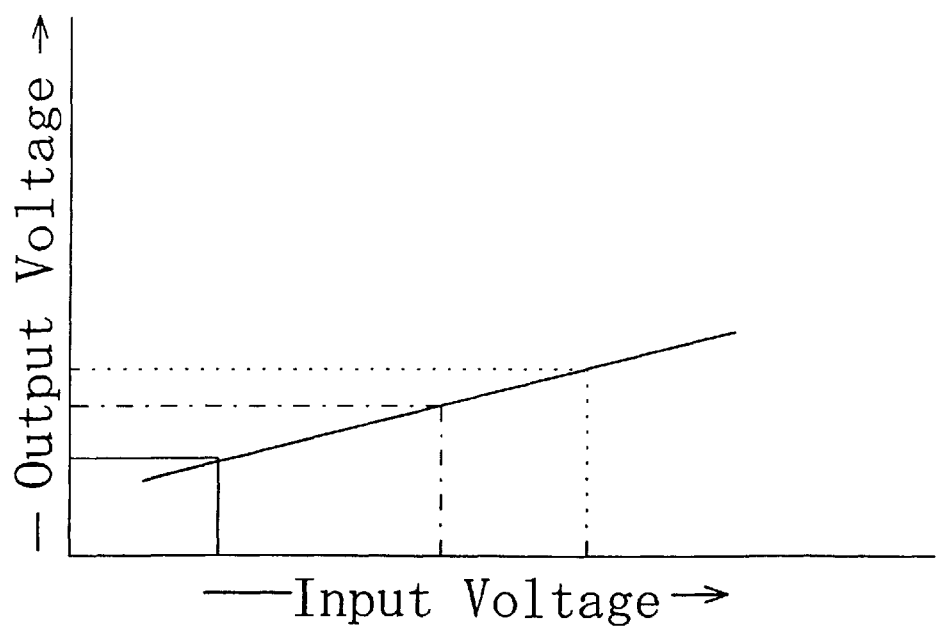
FIG. 2 shows an output voltage versus input voltage characteristic of a DC amplifier used in the DC power supply apparatus shown in FIG. 1.

A pause period control signal generator 26 supplies the controller 14 with a pause period control signal proportional to the value of the AC voltage applied between the input terminals 2a and 2b. The pause period control signal is prepared in the following manner. The AC voltage applied between the input terminals 2a and 2b is converted into a DC voltage in an AC-to-DC converter 28 of the pause period control signal generator 26. The AC-to-DC converter 28 includes a rectifying circuit and a smoothing circuit. The DC voltage is applied to an amplifier 30, e.g. a DC amplifier, of the pause period control signal generator 26. The DC amplifier 30 develops, as the pause period control signal, a DC voltage proportional to the input DC voltage applied to it, as shown in FIG. 2.

Accordingly, the pause period control signal has a value which is smallest when the input commercial AC voltage applied between the input terminals 2a and 2b is 180 V, largest when the input AC voltage is 220 V, and intermediate between the smallest and largest values when the input AC voltage is 200 V. The pause period control signal tracks variations of the actual input commercial AC voltage even when it varies from its nominal value of, for example, 180 V.

Figure 3:
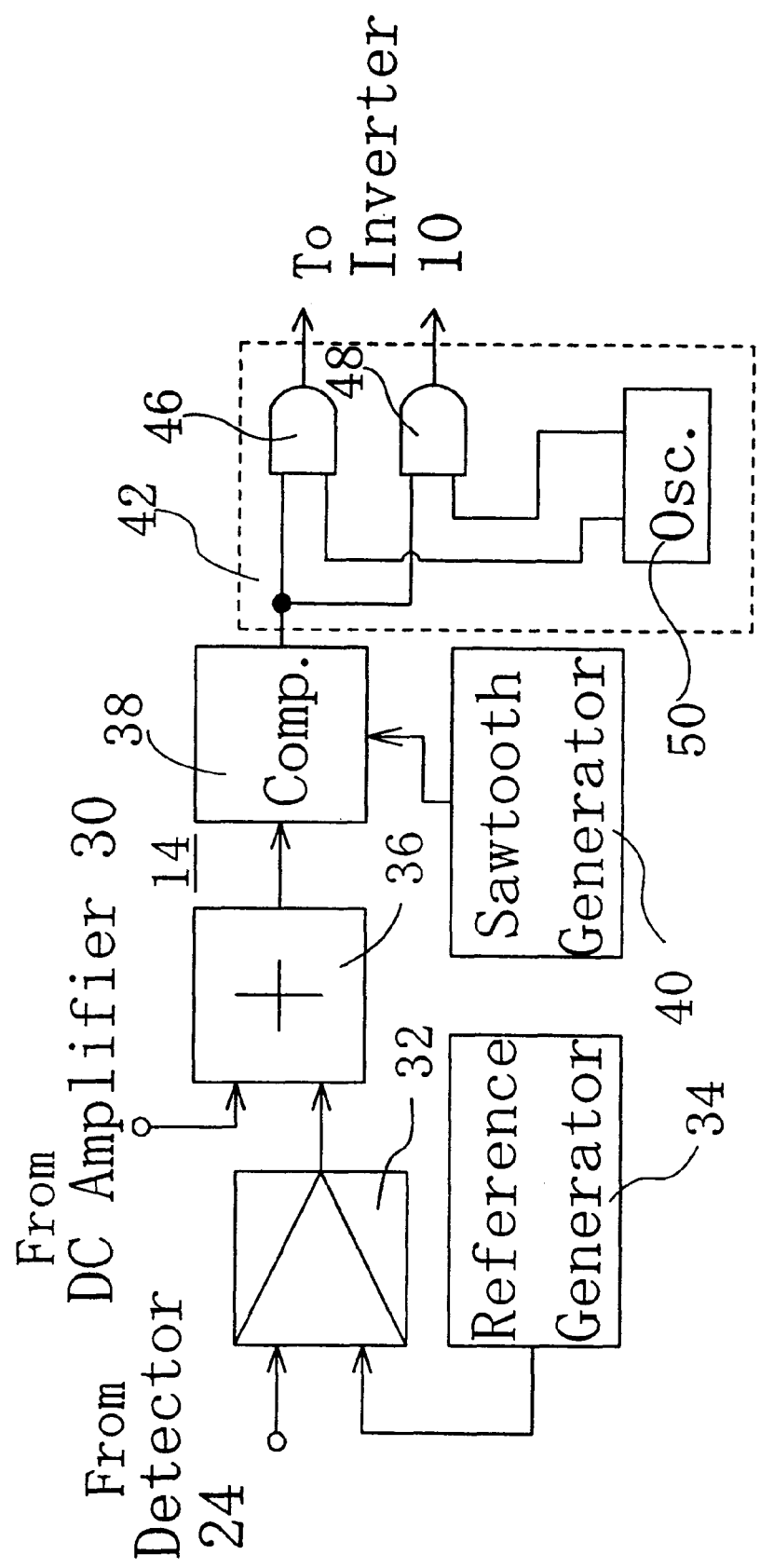
FIG. 3 is a detailed block diagram of a controller used in the DC power supply apparatus shown in FIG. 1.

As shown in FIG. 3, the controller 14 includes an error amplifier 32 which receives the output-current representative signal from the output current detector 24. Further, the error amplifier 32 receives a reference signal from a reference signal generator 34. The reference signal exhibits a voltage value corresponding to a predetermined current value to be outputted as output current. The error amplifier 32 develops an error signal representative of the difference between the output-current representative signal and the reference signal. The error signal is applied to an adder 36.

The adder 36 receives further the pause period control signal from the DC amplifier 30. Thus, the adder 36 develops a sum output signal A shown in FIG. 4(a), which is representative of an algebraic sum of the error signal and the pause period control signal.

Figure 4A:
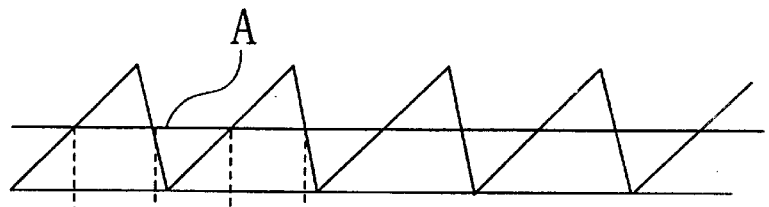
FIGS. 4(a) through 4(f) show waveforms at various portions of the DC power supply apparatus shown in FIG. 1.
Figure 4B:

The sum output signal A is applied to a comparator 38, which also receives a sawtooth signal like the one shown in FIG. 4(a) from a sawtooth generator 40. The sawtooth signal has a predetermined period corresponding to, for example, a frequency of from several kilohertz to several hundred kilohertz. The comparator 38 develops an output signal in a first state, e.g. at a H-level, as shown in FIG. 4(b) when the sawtooth signal is equal to or greater than the sum output signal A, and develops an output signal in a second state, e.g. at a L-level, when the sawtooth signal is below the sum output signal A. Alternatively, the comparator 38 may be so arranged as to develop an output signal which is at the L-level when the sawtooth signal is equal to or greater than the sum output signal A and at the H-level when the sawtooth signal is less than the sum output signal A.

The periods in which the output signal from the comparator 38 is at the H-level and the L-level vary with the value of the sum output signal A. As the sum output signal A is larger, the period in which the output signal of the comparator 38 is at the H-level is shorter, while the L-level period is longer. On the other hand, if the sum output signal A has a smaller value, the period of the H-level of the output signal of the comparator 38 becomes longer, while the L-level period becomes shorter. In either case, the sum of the H-level period and the L-level period of the output of the comparator 38 is equal to one period of the sawtooth signal.

The comparator output signal is applied to one input of each of two dual-input AND gates 46 and 48 forming part of a driver 42 shown in FIG. 3. The AND gate 46 receives at its other input a first pulse signal from an oscillator 50. The AND gate 48 receives at its other input a second pulse signal from the oscillator 50. The first and second pulse signals have a period twice the period of the sawtooth signal and are 180° out of phase with each other and in synchronization with the sawtooth signal, as shown in FIGS. 4(c) and 4(d).

Figure 4C:
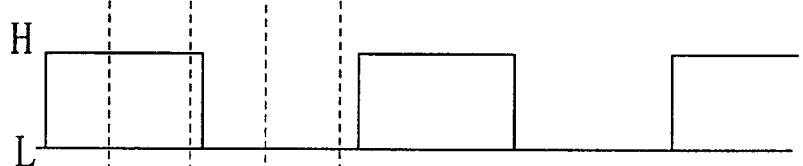
Figure 4D:
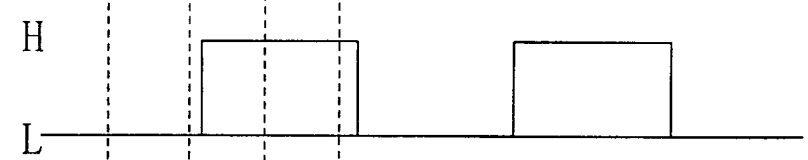
Figure 4E:
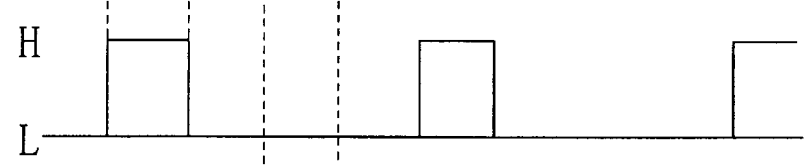
Figure 4F:
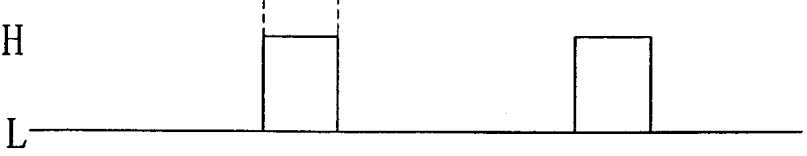

Then, during a time period in which both the first pulse signal shown in FIG. 4(c) and the comparator output signal shown in FIG. 4(b) are at the H-level, the AND gate 46 develops an output signal at the H-level shown in FIG. 4(e), which is applied to the IGBTs 10a and 10d as the first conduction control signal. During a time period in which both the second pulse signal shown in FIG. 4(d) and the comparator output signal are at the H-level, the AND gate 48 develops a H-level output signal shown in FIG. 4(f) is applied to the IGBTs 10b and 10c as the second conduction control signal.

The time period in which neither first nor second conduction control signals are developed, i.e. the time period in which the output signals of both of the AND gates 46 and 48 are at the L-level, is the pause period. The pause period is coincident in time with the period in which the comparator output signal from the comparator 38 is at the L-level. This means that the length of the pause period varies with the value of the sum output signal A provided by the adder 36.

The solid line in FIG. 5(a) represents the sum output signal $A_{180}$ developed when the input commercial AC voltage is 180 V. The dash-dot-dash line represents the sum output signal $A_{200}$ developed when the commercial AC voltage of 200 V is inputted, and the dotted line represents the sum output signal $A_{220}$ developed when the commercial AC voltage of 220 V is inputted. In all of these three cases, the error signals supplied from the error amplifier 32 to the adder 36 are assumed to be equal.

When the commercial AC voltage is a lower voltage of 180 V, and, therefore, the sum output signal $A_{180}$ is low, the period in which the output signal of the comparator 38 is at the L-level is shorter, as shown in FIG. 5(b). If the higher commercial AC voltage of 220 V is applied, the sum output signal $A_{220}$ is higher, and the period in which the comparator output signal is at the L-level is longer, as shown in FIG. 5(d). Similarly, if the input commercial AC voltage has an intermediate value of 200 V, the resulting sum output signal has an intermediate value, and the period in which the comparator output signal is at the L-level is intermediate (FIG. 5(c)). Thus, the pause period coincident in time with the period in which the comparator output signal from the comparator 38 is at the L-level results.

It should be noted that since the sum output signal from the adder 36 contains the output of the error amplifier 32, feedback control is provided to make the output current equal to the current represented by the reference signal.

Figure 6A:
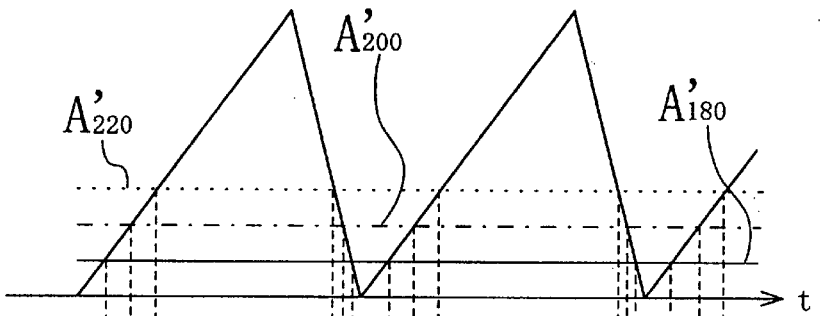
FIGS. 6(a) through 6(d) show a sawtooth signal provided by the sawtooth generator and output signals from the comparator of the DC power supply apparatus shown in FIG. 1, when the input commercial AC voltage is 180V, 200 V and 220 V, respectively, and the error amplifier develops an error output equal to 0.
Figure 6B:
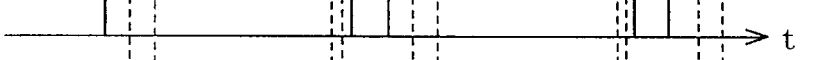
Figure 6C:
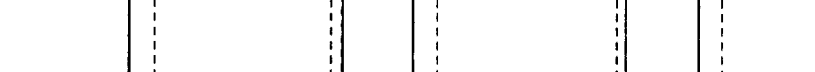
Figure 6D:

There is no case in which the pause period is zero, but the pause period exists in any cases. Even if, for example, the output signal of the error amplifier 32 is zero, in other words, even if the output current is equal to the current represented by the reference signal, the pause period control signal having a value proportional to the commercial AC voltage is applied to the controller 14 from the DC amplifier 30. Accordingly, the output of the adder 36 cannot be zero. In this case, the sum output signal from the adder 36 when the commercial AC voltage is 180 V, is as represented by a solid line $A'_{180}$ shown in FIG. 6(a). Similarly, the sum output signal for the commercial AC voltage of 200 V is represented by a dash-dot-dash line $A'_{200}$ in FIG. 6(a), and the sum output signal for the commercial AC voltage of 220 V is represented by a dotted line $A'_{220}$ in FIG. 6(a). In other words, as the input commercial AC voltage is higher, the adder 36 develops a larger output signal. Accordingly, the period in which the comparator output signal from the comparator 38 is at the L-level is longer as the input commercial AC voltage is higher, as is understood from FIGS. 6(b), 6(c) and 6(d). FIGS. 6(b), 6(c) and 6(d) show the comparator output signals from the comparator 38 when the commercial AC voltage of 180 V, 200 V and 220 V are applied, respectively.

Figure 7:
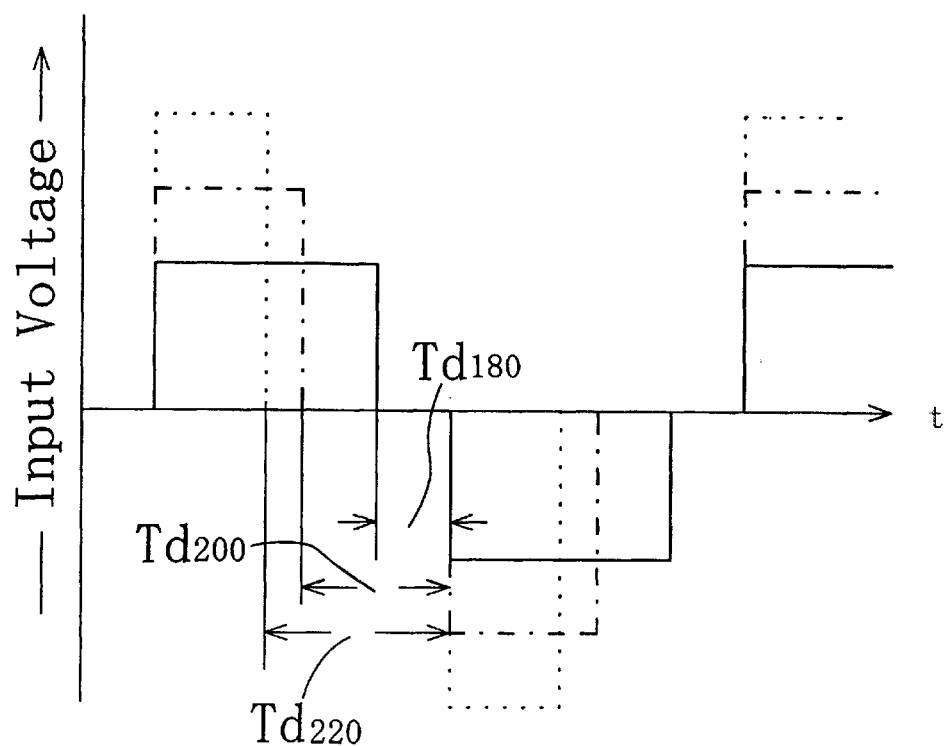
FIG. 7 shows input voltages applied to a high-frequency transformer of the DC power supply apparatus shown in FIG. 1 when the input commercial AC voltage is 180V, 200 V and 220 V, respectively.
Figure 8:
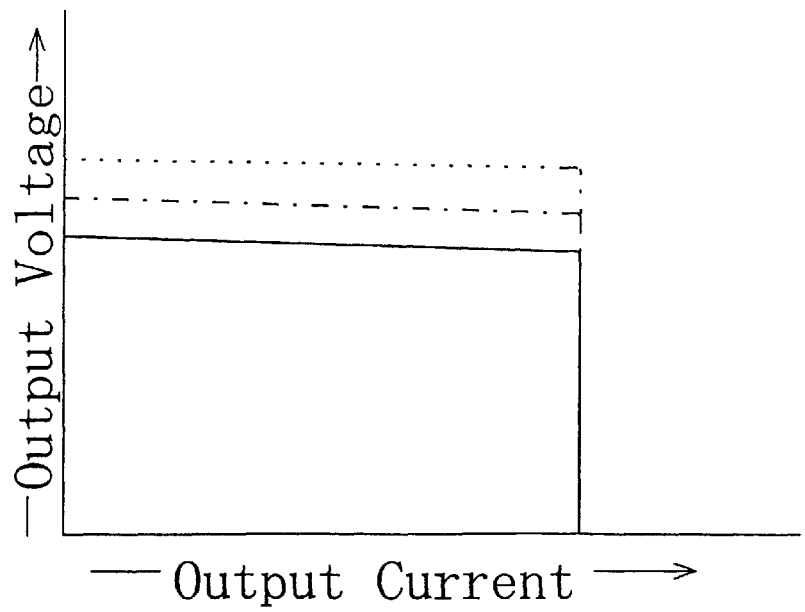
FIG. 8 shows relationships between output current and output voltage in a prior art DC power supply apparatus for different input commercial AC voltages.
Figure 9:
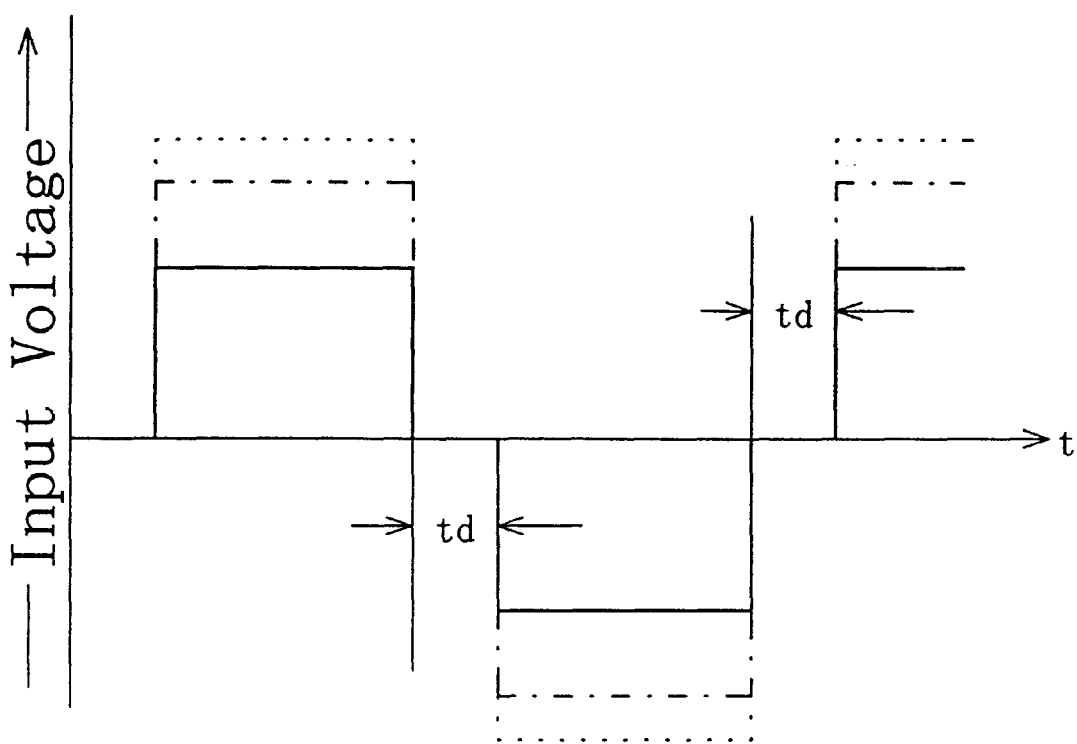
FIG. 9 shows voltages inputted to a voltage transformer used in the prior art DC power supply apparatus for different input commercial AC voltages.

Then, as shown in FIG. 7, even when the output current has a value same as the current value represented by the reference signal, the pause period $Td_{180}$ is short when the lower input commercial AC voltage of 180 V as represented by a solid line is applied, whereby the period in which a DC voltage corresponding to the 180 V AC voltage is applied through the inverter 10 to the primary winding 12p of the high-frequency transformer 12 is longer. Similarly, the pause period $Td_{220}$ is longer when the higher commercial AC voltage of 220 V as represented by a dotted line in FIG. 7 is inputted, and, therefore, the period in which a DC voltage corresponding to the 220 V AC voltage is applied through the inverter 10 to the primary winding 12p becomes short. Also, as represented by a dash-dot-dash line in FIG. 7, when the commercial AC voltage of intermediate value of 200 V is applied, the length of the pause period $Td_{200}$ has an intermediate value, and, therefore, the length of the period during which a DC voltage corresponding to the 200 V AC voltage to the primary winding 12p of the transformer 12 is intermediate between those for the commercial AC voltages of 180 V and 220 V.

The output voltage Vo of the DC power supply apparatus is expressed by the following equation (2).

$$Vo = V1 \times n \times \frac{Ton}{Ts} = V1 \times n \times \frac{Ts - Td}{Ts} \qquad (2)$$

where V1 is the voltage across the primary winding 12p of the high-frequency transformer 12, n is the turns ratio of the high-frequency transformer 12, Ts is the period of the sawtooth signal, Td is the length of the pause period, and Ton is the conduction period of the IGBTs 10a through 10d. Ts and n are both constant. Therefore, by maintaining V1*Ton constant, a constant output voltage is developed. The primary winding voltage V1 is higher as the commercial AC voltage applied to the DC power supply apparatus is higher. The pause period is longer as the commercial AC voltage is higher, and, accordingly, the conduction period Ton of the IGBTs 10a, 10b, 10c and 10d is shorter as the commercial AC voltage applied to the DC power supply apparatus is higher.

The shortest pause period and, accordingly, the longest conduction period are obtained when the error signal is zero. In this case, as described above, the conduction period is shorter as the input commercial AC voltage is higher. The highest possible voltage $E_{max}$ applied to the transformer appearing in the expression (1) is determined by the value of the input commercial AC voltage, and $Ton_{max}$, the longest time period during which the input voltage is applied to the transformer, is determined by the conduction period when the error signal is zero. In this case, regardless of the value of the input commercial AC voltage, $E_{max} * Ton_{max}$ can be set to a predetermined value by appropriately selecting the gain of the DC amplifier 30.

Accordingly, the turns ratio n can be chosen so as to provide a small-sized high-frequency transformer 12. In addition, it is not necessary to connect a voltage-boosting converter and a voltage-raising converter between the smoothing circuit 8 and the inverter 10, and, therefore, no controller for such converters is required. This also enables the down-sizing of the DC power supply apparatus.

Although the present invention has been described by an embodiment in which the DC power supply apparatus receives one of 180 V, 200 V and 220 V commercial AC voltages, the values of the input commercial AC voltages are not limited to them, but they may be, for example, AC voltages of 100 V and 400 V, or 200 V and 400 V. Commercial AC voltages of various values are used in the world. They may be, for example, 100 V, 115 V, 200 V, 220 V, 380 V, 400 V and 440 V. The DC power supply apparatus according to the present invention may be so designed to be useable with all of such various voltages. In such a case, an analog-to-digital (A/D) converter for converting the DC voltage from the AC-to-DC converter 28 to a digital signal, a memory for storing a digital pause period control signal corresponding to the digital signal from the A/D converter and a digital-to-analog (D/A) converter for converting the digital pause period control signal read from the memory to an analog signal may be substituted for the DC amplifier 30. Of course, the combination of the A/D converter, the memory and the D/A converter may be used in the above-described embodiment.

In the described embodiment, the output-current representative signal from the output-current detector 24 is applied to the controller 14. However, a voltage detector or a power detector which detects output-voltage or output-power and applies an output-voltage or output-power representative signal to the controller 14 may be substituted for the output-current detector 24.

The inverter 10 of the described embodiment is feedback controlled in accordance with the output-current representative signal, but it may not be feedback controlled. In such a case, the output signal from the DC amplifier 30 may be directly coupled to the comparator 38.

It should also be noted that a switching regulator including at least one semiconductor switching device may be substituted for the inverter 10 in the above-described embodiment.

What is claimed is:

1. A DC power supply apparatus comprising:
   an AC-to-DC converter for converting a commercial AC signal into a first DC signal;
   a transformer;
   a DC-to-high-frequency converter for converting said first DC signal into a high frequency signal and applying said high-frequency signal to said transformer, said DC-to-high-frequency converter including at least first and second semiconductor switching devices, said first semiconductor switching device being rendered conductive during a period in which first of at least first and second alternately occurring conduction control signals is applied thereto, to thereby provide said transformer with said first DC signal in a first polarity, said second semiconductor switching device being rendered conductive during a period in which said second conduction control signal is applied thereto, to thereby provide said transformer with said first DC signal in a second polarity opposite to said first polarity;
   a high-frequency-to-DC converter for converting said high-frequency signal as transformed by said transformer to a second DC signal and applying said second DC signal to a load; and
   a controller repeatedly generating said first and second conduction control signals with a pause period disposed between the end of said first conduction control signal and the beginning of said second conduction control signal occurring subsequent to the occurrence of said first conduction control signal and between the end of said second conduction control signal and the beginning of said first conduction control signal occurring subsequent to the occurrence of said second conduction control signal;
   said controller comprising:
      a pause period control signal generator receiving said commercial AC signal and generating a pause period control signal having a value proportional to a voltage value of said commercial AC signal;
      a sawtooth generator generating a sawtooth signal having a predetermined period; and
      a comparator for developing said at least first and second conduction control signals with said pause period, said pause period being a period during which the value of said sawtooth signal changes away from the value of said pause period control signal in one direction and returns to the value of said pause period control signal.

2. The DC power supply apparatus according to claim 1 wherein said pause period control signal generator comprises an AC-to-DC converter for converting the voltage of said commercial AC signal to a DC voltage.

3. A DC power supply apparatus comprising:
   an AC-to-DC converter for converting a commercial AC signal into a first DC signal;
   a transformer;
   a DC-to-high-frequency converter for converting said first DC signal into a high frequency signal and applying said high-frequency signal to said transformer, said DC-to-high-frequency converter including at least first and second semiconductor switching devices, said first semiconductor switching device being rendered conductive during a period in which first of at least first and second alternately occurring conduction control signals is applied thereto, to thereby provide said transformer with said first DC signal in a first polarity, said second semiconductor switching device being rendered conductive during a period in which said second conduction control signal is applied thereto, to thereby provide said transformer with said first DC signal in a second polarity opposite to said first polarity;
   a high-frequency-to-DC converter for converting said high-frequency signal as transformed by said transformer to a second DC signal and applying said second DC signal to a load; and
   a controller repeatedly generating said first and second conduction control signals with a pause period disposed between the end of said first conduction control signal and the beginning of said second conduction control signal occurring subsequent to the occurrence of said first conduction control signal and between the end of said second conduction control signal and the beginning of said first conduction control signal occurring subsequent to the occurrence of said second conduction control signal;
   said controller comprising:
      a pause period control signal generator receiving said commercial AC signal and generating a pause period control signal having a value proportional to a voltage value of said commercial AC signal;
      a sawtooth generator generating a sawtooth signal having a predetermined period;
      a detector for detecting an output signal supplied to said load and generating an output-representative signal representing a detected output signal;
      an error signal generator for generating an error signal representative of a difference between a sum of said output-representative signal and said pause period control signal and a predetermined reference signal; and
      a comparator for developing said at least first and second conduction control signals with said pause period, said pause period being a period during which the value of said sawtooth signal changes away from the value of said error signal and returns to the value of said pause period control signal.

4. The DC power supply apparatus according to claim 3 wherein said pause period control signal generator comprises an AC-to-DC converter for converting the voltage of said commercial AC signal to a DC voltage.

* * * * *